(12) United States Patent
Majidi et al.

(10) Patent No.: US 8,309,201 B2
(45) Date of Patent: Nov. 13, 2012

(54) SYMMETRIC, SPATULAR ATTACHMENTS FOR ENHANCED ADHESION OF MICRO- AND NANO-FIBERS

(75) Inventors: Carmel Majidi, Berkeley, CA (US); Richard Groff, Berkeley, CA (US); Ronald S. Fearing, El Cerrito, CA (US)

(73) Assignee: The Regents of the University of California, Oakland, CA (US)

( * ) Notice: Subject to any disclaimer, the term of this patent is extended or adjusted under 35 U.S.C. 154(b) by 1094 days.

(21) Appl. No.: 11/843,619

(22) Filed: Aug. 22, 2007

(65) Prior Publication Data
US 2008/0070002 A1 Mar. 20, 2008

Related U.S. Application Data

(60) Provisional application No. 60/839,839, filed on Aug. 23, 2006.

(51) Int. Cl.
*B32B 5/00* (2006.01)
(52) U.S. Cl. .......................................... 428/141; 156/61
(58) Field of Classification Search .................... 428/141
See application file for complete search history.

(56) References Cited

U.S. PATENT DOCUMENTS

| | | | |
|---|---|---|---|
| 4,545,831 A | 10/1985 | Ornstein | |
| 4,704,745 A | 11/1987 | Reaver | |
| 5,077,870 A | 1/1992 | Melbye et al. | |
| 5,264,722 A | 11/1993 | Tonucci et al. | |
| 5,392,498 A | 2/1995 | Goulait et al. | |
| 5,843,657 A | 12/1998 | Liotta et al. | |
| 5,843,767 A | 12/1998 | Beattie | |
| 5,951,931 A * | 9/1999 | Murasaki et al. | ............. 264/167 |
| 5,959,200 A | 9/1999 | Chui et al. | |

(Continued)

FOREIGN PATENT DOCUMENTS
JP   2002-307398 A   10/2002

(Continued)

OTHER PUBLICATIONS http://www.pnas.org%02cgi%02doi%0210.1073%02pnas.0408304102/ (Nov. 28, 2011).*

(Continued)

*Primary Examiner* — Gerard Higgins
*Assistant Examiner* — Sathavaram I Reddy
(74) *Attorney, Agent, or Firm* — Morrison & Foerster LLP

(57) ABSTRACT

A fabricated nano-structure includes a substrate, a supporting stalk, a node, and at least two spatular plate portions. The supporting stalk has a first end opposite a second end. The first end of the supporting stalk is connected to the substrate. The supporting stalk has a diameter range of about 50 nanometers to about 2 microns. A node is disposed at the second end of the supporting stalk. At least two spatular plate portions are connected to the node. The at least two spatular plate portions have planar geometries and are radially distributed about the node. The at least two spatular plate portions has a ratio of a maximum plate thickness to a maximum plate length of at most about 1:20. The maximum plate length is measured along a line from a boundary of the spatular plate portion to a centroid of the node. The maximum plate length is at least about 100 nanometers. The at least two spatular plate portion adhere to a contact surface using intermolecular forces when the spatular plate portions are in contact with the contact surface.

16 Claims, 8 Drawing Sheets

U.S. PATENT DOCUMENTS

| | | | |
|---|---|---|---|
| 6,055,680 | A | 5/2000 | Tolbert |
| 6,393,327 | B1 | 5/2002 | Scribner |
| 6,713,151 | B1 | 3/2004 | Dean et al. |
| 6,722,026 | B1 | 4/2004 | Lent |
| 6,737,160 | B1 | 5/2004 | Full et al. |
| 6,753,635 | B2 | 6/2004 | Kuhlmann-Wilsdorf |
| 6,872,439 | B2 | 3/2005 | Fearing et al. |
| 7,011,723 | B2 | 3/2006 | Full et al. |
| 7,132,161 | B2 | 11/2006 | Knowles et al. |
| 7,144,624 | B2 | 12/2006 | Knowles et al. |
| 7,175,723 | B2 | 2/2007 | Jones et al. |
| 7,229,685 | B2 | 6/2007 | Full et al. |
| 7,301,779 | B2 | 11/2007 | Honlein et al. |
| 7,633,148 | B2 | 12/2009 | Awano et al. |
| 2003/0124312 | A1* | 7/2003 | Autumn .................. 428/141 |
| 2004/0009353 | A1 | 1/2004 | Knowles et al. |
| 2004/0076822 | A1 | 4/2004 | Jagota et al. |
| 2004/0134045 | A1* | 7/2004 | Poulakis et al. ............ 24/442 |
| 2004/0250950 | A1 | 12/2004 | Dubrow |
| 2005/0119640 | A1 | 6/2005 | Sverduk et al. |
| 2005/0148984 | A1 | 7/2005 | Lindsay et al. |
| 2005/0151385 | A1* | 7/2005 | Autumn et al. ............ 294/86.4 |
| 2005/0181170 | A1* | 8/2005 | Fearing et al. ............... 428/85 |
| 2006/0005362 | A1* | 1/2006 | Arzt et al. .................. 24/442 |
| 2006/0078725 | A1 | 4/2006 | Fearing et al. |
| 2006/0202355 | A1 | 9/2006 | Majidi et al. |

FOREIGN PATENT DOCUMENTS

| | | | |
|---|---|---|---|
| WO | WO-99/32005 | A1 | 7/1999 |
| WO | WO 01/49776 | A2 | 7/2001 |
| WO | WO-03/095190 | A2 | 11/2003 |
| WO | WO-2005/033237 | A2 | 4/2005 |
| WO | WO-2006/060149 | A2 | 6/2006 |
| WO | WO-2006/094025 | A2 | 9/2006 |
| WO | WO-2006/130864 | A2 | 12/2006 |
| WO | WO-2007/040563 | A2 | 4/2007 |
| WO | WO-2007/061854 | A2 | 5/2007 |

OTHER PUBLICATIONS

International Search Report and Written Opinion mailed May 6, 2008, for PCT Application No. PCT/US07/76582 filed Aug. 22, 2007, 11 pages.

Autumn, K. et al. (Jun. 2000). "Adhesive Force of a Single Gecko Foot-Hair," *Nature* 405:681-685.

Autumn, K. et al. (Sep. 17, 2002). "Evidence for Van Der Waals Adhesion in Gecko Setae," *Proceedings of the National Academy of Sciences of the United States of America* 99(19):12252-12256.

Cartmill, M. (1985). "Climbing" Chapter 5 In *Functional Vertebrate Morphology*. Hildebrand, M. et al. eds., The Belknap Press of Harvard University Press: Cambridge, MA, pp. 73-88.

Edwards, J. S. (Oct. 1962). "Observations on the Development and Predatory Habit of Two Reduviid heteroptera, Rhinocoris carmelita stal and Platymeris rhadamanthus gerst," *The Proceedings of the Royal Entomological Society of London* 37:89-98.

Edwards, J. S. et al. (1970). "The Adhesive Pads of Heteroptera: A Re-Examination," *The Proceedings of the Royal Entomological Society of London* 45:1-5.

Hansen, W. R. et al. (Jan. 11, 2005). "Evidence for Self-Cleaning in Gecko Setae," *Proceedings of the National Academy of Sciences of the United States of America* 102(2):385-389.

Hora, S. L. (1923). "The Adhesive Apparatus on the Toes of certain Geckos and Tree-frogs," *Journal of the Asiatic Society of Bengal* 9:137-145.

Huber, G. et al. (Nov. 8, 2005). "Evidence for Capillarity Contributions to Gecko Adhesion from Single Spatula Nanomechanical Measurements," *Proceedings of the National Academy of Sciences of the United States of America* 102(45):16293-16296.

Irschick, D. J. et al. (1996). "A Comparative Analysis of Clinging Ability Among Pad-Bearing Lizards," *Biological Journal of the Linnean Society* 59:21-35.

Janra (Oct. 18, 2002). "Gecko Feet In-Hair-Ently Sticky (Science)," located at <http://www.kuro5shin.org/?op=displaystory;sid=2002/10/18/03840/816> visited on Nov. 17, 2005. (12 pages).

Kendall, K. (1971). "The Adhesion and Surface Energy of Elastic Solids," *Journal of Physics D: Applied Physics* 4(7):1186-1195.

Liang, Y. A. et al. (Jun. 2000). "Adhesion Force Measurements on Single Gecko Setae," *Technical Digest of the 2000 Solid-State Sensor and Actuator Workshop*, Hilton Head Island, SC, pp. 33-38.

Maderson, P. F. A. (Aug. 1964). "Keratinized Epidermal Derivatives as an Aid to Climbing in Gekkonid Lizards," *Nature* 203:780-781.

Mahendra, B. C. (1941). "Contributions to the Bionomics, Anatomy, Reproduction and Development of the Indian House-Gecko, Hemidactylus Flaviviridis Ruppel," *Proceedings of the Indian Academy of Science*, pp. 288-306.

Paul, R. C. (Oct. 21, 1999). "How Do Flies and Other Insects Walk Up Walls, Ceilings and Even Apparently Smooth Glass Windows?," located at <http://www.sciam.com/askexpert_question.cfm?articleID=00053735-601D-1C72-9EB7809EC588F2D7> visited on Jun. 15, 2007. (3 pages).

Persson, B. N. J. et al. (Dec. 1, 2003). "The Effect of Surface Roughness on the Adhesion of Elastic Plates with Application to Biological Systems," *Journal of Chemical Physics* 119(21):11437-14444.

Peterson, J. A. et al. (Jul. 1981). "A Case History in Retrograde Evolution: The Onca Lineage in Anoline Lizards. II. Subdigital Fine Structure," *Bulletin of the Museum of Comparative Zoology* 149(4):215-268.

Ruibal, R. et al. (Nov. 1965). "The Structure of the Digital Setae of Lizards," Journal of Morphology 117: 271-294.

Russell, A. P. (1975). "Contribution to the Functional Analysis of the Foot of the Tokay, Gekko gecko (Reptilla: Gekkonidae)," *Journal of Zoology London* 176:437-476.

Spice, B. (Jul. 7, 2003). "Scientists Unravel Mystery of Gecko's Sticky Feet," post-gazette.com Health & Science, located at <http://www.post-gazette.com/healthscience/20030707gecko0707p2.asp> visited on Jun. 19, 2007. (4 pages).

Stork, N. E. (Mar. 1980). "A Scanning Electron Microscope Study of Tarsal Adhesive Setae in the Coleoptera" *Zoological Journal of the Linnean Society* 68: 173-306.

Stork, N. E. (Oct. 1980). "Experimental Analysis of Adhesion of Chrysolina polita (Chrysomelidae: Coleoptera) on a Variety of Surfaces," *Journal of Experimental Biology* 88: 91-107.

Supplemental European Search Report mailed Nov. 3, 2004, for Eurpoean Application No. 00993217.9 filed Dec. 11, 2000, 3 pages.

Szilard, R. (2004). *Theories and Applications of Plate Analysis: Classical, Numerical and Engineering Methods*. John Wiley & Sons: Hoboken, New Jersey, pp. 5-7.

Thurn-Albrecht, T. et al. (Dec. 2000). "Ultrahigh-Density Nanowire Arrays Grown in Self-Assembled Diblock Copolymer Templates," *Science* 290:2126-2129.

U.S. Appl. No. 11/365,094, filed Feb. 28, 2006 for Kellar et al.
U.S. Appl. No. 11/601,528, filed Nov. 17, 2006 for Fearing et al.
U.S. Appl. No. 11/657,431, filed Jan. 23, 2007 for Jones et al.
U.S. Appl. No. 11/811,882, filed Jun. 11, 2007 for Autumn et al.

Williams, E. E. (Mar. 1982). "Convergent and Alternative Designs in the Digital Adhesive Pads of Scincid Lizards," *Science* 215: 1509-1511.

Office Action received for Japanese Patent Application No. 2001-550314, mailed on Oct. 19, 2010, 8 pages ( 4 pages of English Translation & 4 pages of office Action).

Gasc et al., "Comptes Rendus Des Seances De L'Academie Des Sciences", Serie 3. Sciences de la Vie, vol. 294, No. 3, 1982, pp. 169-174.

Office Action received for Japanese Patent Application No. 2001-550314, mailed on Apr. 19, 2011, 4 pages (2 pages of English Translation and 2 pages of Office Action).

Extended European Search Report received for European Patent Application No. 06772042.5, mailed on Mar. 8, 2011, 4 pages.

Non Final Office Action received for U.S. Appl. No. 12/352,552, mailed on Feb. 13, 2012, 21 pages.

* cited by examiner

FIG. 3A
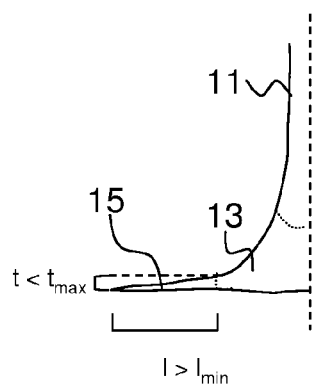
FIG. 3B
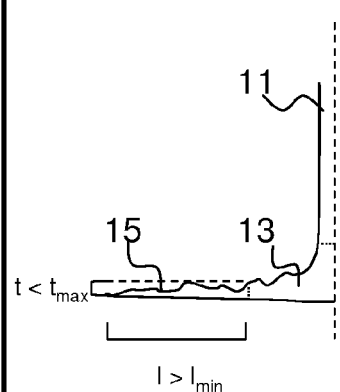
FIG. 3C
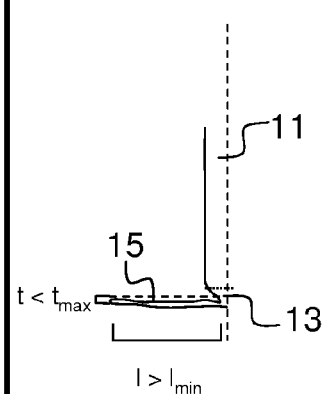
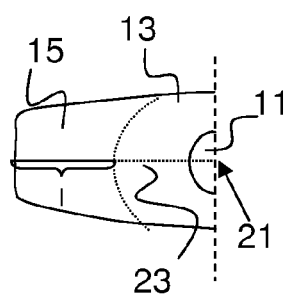
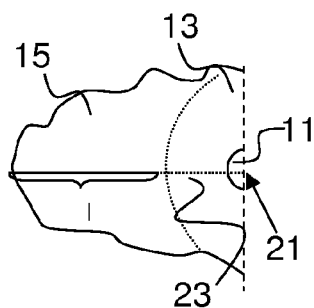
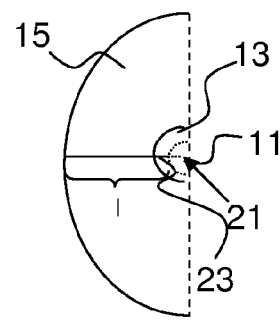
FIG. 3D
FIG. 3E
FIG. 3F

FIG. 6

| Bond Strengths | | | | |
|---|---|---|---|---|
| Spatular Plate Width (w) (μm) | Gecko-Like Spatula (nN) | Opposing Spatula (nN) | Rounded Spatula (nN) | Rounded Spatula Suction only (nN) |
| 0.22 | 6.6 | 110 | 160 | 3.9 |
| 0.3 | 9.0 | 150 | 220 | 7.2 |
| 0.4 | 12 | 200 | 290 | 13 |
| 0.8 | 24 | 400 | 580 | 51 |
| 1.2 | 36 | 600 | 870 | 110 |

SYMMETRIC, SPATULAR ATTACHMENTS FOR ENHANCED ADHESION OF MICRO- AND NANO-FIBERS

CROSS-REFERENCE TO RELATED APPLICATION

The present application claims priority to U.S. Provisional Application Ser. No. 60/839,839, filed on Aug. 23, 2006, which is incorporated herein by reference in its entirety for all purposes for all purposes.

This invention was made with Government support under Grant Contract No. EEC-0304730 awarded by the National Science Foundation.

BACKGROUND

1. Field

The present application relates generally to the field of micro-structures, and, more particularly, to adhesive microstructures.

2. Description of the Related Art

A natural adhesive system found in geckos is composed of micro-sized stalks (setae) that branch out into 100-1000 nano-sized branches (spatulae). At the end of these branches is a thin plate where adhesion to an opposing surface occurs through van der Waals forces, either by dispersion forces (Autumn K, et al. "Evidence for van der Waals adhesion in gecko setae," PNAS 99, pp. 12252-12256 (2002), which is incorporated herein by reference in its entirety for all purposes), or by hydrogen bonding (Huber G, et al. "Evidence for capillarity contributions to gecko adhesion from single spatula nanomechanical measurements," PNAS 1-2, 16293-16296 (2005), which is incorporated herein by reference in its entirety for all purposes). Microfabricating adhesive nano-fibers mimicking gecko foot-hair have been previously patented, see U.S. Pat. No. 6,872,439 and U.S. Pat. No. 6,737,160, each of which is hereby incorporated by reference in its entirety for all purposes. Like the wall climbing gecko, these microfabricated nano-fiber arrays have the ability to attach and detach to opposing substrates.

SUMMARY

In one exemplary embodiment, a fabricated nano-structure includes a substrate, a supporting stalk, a node, and at least two spatular plate portions. The supporting stalk has a first end opposite a second end. The first end of the supporting stalk is connected to the substrate. The supporting stalk has a diameter range of 50 nanometers to 2 microns. A node is disposed at the second end of the supporting stalk. At least two spatular plate portions are connected to the node. The at least two spatular plate portions have planar geometries and are radially distributed about the node. The at least two spatular plate portions has a ratio of a maximum plate thickness to a maximum plate length of at most 1:20. The maximum plate length is measured along a line from a boundary of the spatular plate portion to a centroid of the node. The maximum plate length is at least 100 nanometers. The at least two spatular plate portion adhere to a contact surface using intermolecular forces when the spatular plate portions are in contact with the contact surface.

DESCRIPTION OF THE FIGURES

FIG. 3A illustrates a side view of a cross-section of an exemplary portion of a fabricated nano-structure;

FIG. 3B illustrates a side view of a cross-section of another exemplary portion of a fabricated nano-structure;

FIG. 3C illustrates a side view of a cross-section of another exemplary portion of a fabricated nano-structure;

FIG. 3D illustrates a top view of the exemplary portion of a fabricated nano-structure depicted in FIG. 3A;

FIG. 3E illustrates a top view of the exemplary portion of a fabricated nano-structure depicted in FIG. 3B;

FIG. 3F illustrates a top view of the exemplary portion of a fabricated nano-structure depicted in FIG. 3C;

FIG. 6 is a chart of exemplary bond strengths for various spatular plate portions;

DETAILED DESCRIPTION

The following description sets forth numerous specific configurations, parameters, and the like. It should be recognized, however, that such description is not intended as a limitation on the scope of the present invention, but instead provided as a description of exemplary embodiments.

As described above, a microfabricated nano-fiber array can feature at least one supporting stalk attached to a substrate with a spatular plate attached to the end of the stalk, where adhesion occurs. However, if stronger or more permanent adhesion is desired, in one exemplary embodiment, the spatular plate is modified according to predictions based on linear elastic membrane theory. The nano-fiber spatular structure is a plate-like structure, planar and thin enough to have mechanical properties of a linear elastic membrane. Surface roughness and length of the spatular plate portions determine the optimal thickness of the plate to achieve strong adhesion.

Figure 1:
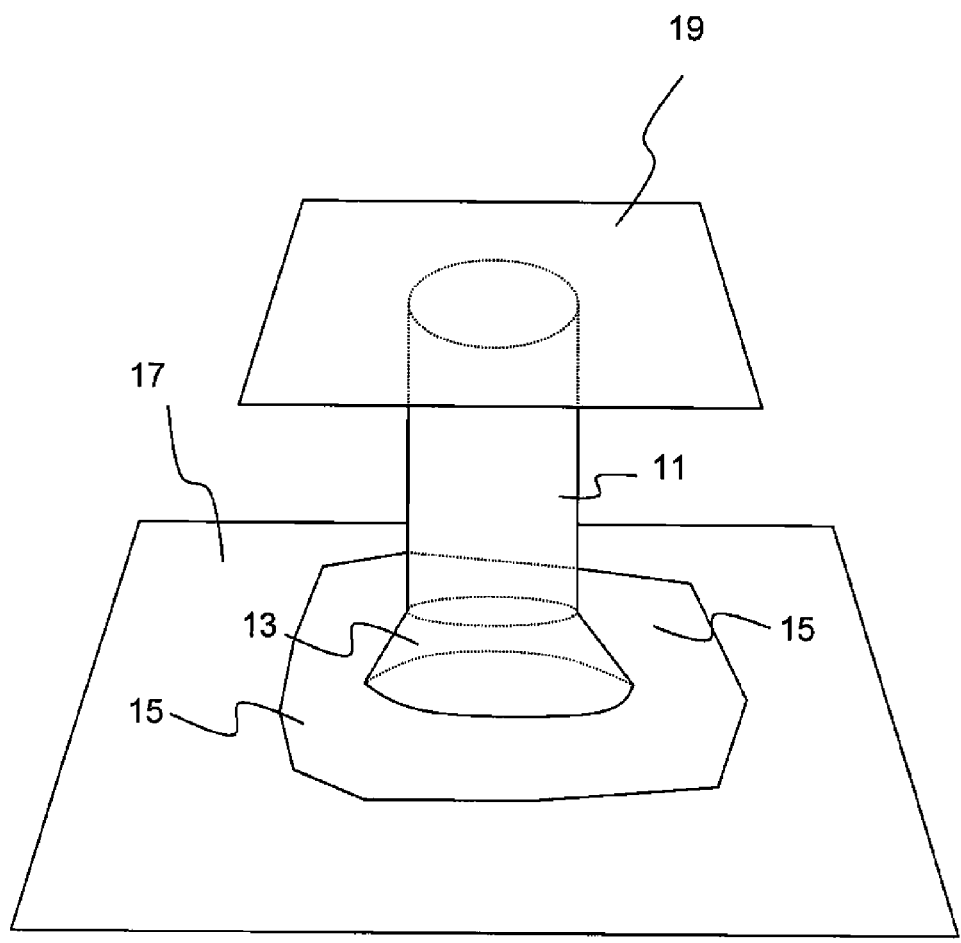
FIG. 1 illustrates a side view of a fabricated nano-structure in contact with a substrate.

With reference to FIG. 1, an exemplary fabricated nano-fiber structure is illustrated. The structure has a supporting stalk 11 with a first end and a second end. The second end is opposite the first end. The first end is connected to a substrate 19. The supporting stalk 11 has a diameter of about 50 nanometers to about 2 microns. The second end of the supporting stalk 11 is connected to a node 13. Spatular plate portions 15 are connected to node 13. Spatular plate portions 15 are radially distributed about the node 13.

In the present exemplary embodiment, the node 13 is the intermediate structure between the supporting stalk 11 and spatular plate portions 15. The node 13 can have the same or different dimensions as the supporting stalk 11. The radially distributed spatular plate portions 15 are symmetrically connected to the node 13 so that at least two spatular plate portions 15 provide opposing peeling forces. The opposing peeling forces enhance the adhesion of the fabricated nanofiber structure to a contact surface 17. The symmetry of the spatular plate portions 15 facilitates the formation of opposing peel fronts when the supporting stalk 11 is pulled from the contact surface 17. Opposing peel fronts lead to a low peel angle, which, according to the Kendall peel model, results in a high peel resistance.

Figure 2A:
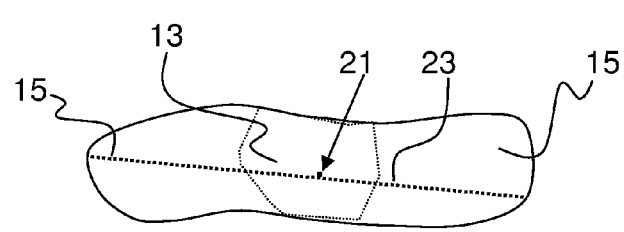
FIG. 2A illustrates a top view of an exemplary spatular plate portion of a fabricated nano-structure.
Figure 2B:
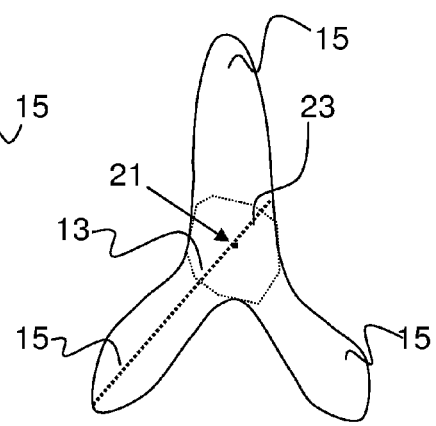
FIG. 2B illustrates a top view of another exemplary spatular plate portion of a fabricated nano-structure.
Figure 2C:
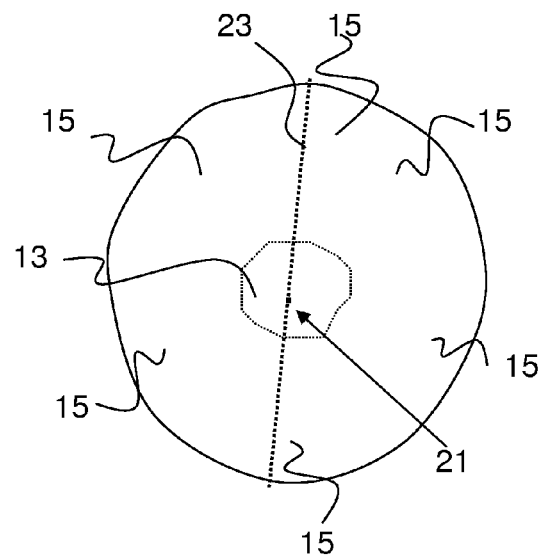
FIG. 2C illustrates a top view of another exemplary spatular plate portion of a fabricated nano-structure.

FIGS. 2A, 2B, and 2C illustrate various exemplary embodiments of spatular plate portions 15 radially distributed about node 13. In particular, top views of transverse planes of the node 13 and spatular plate portions 15 are illustrated in the various exemplary embodiments. A transverse plane contains the greatest cross-sectional area of the node 13 and the spatular plate portions 15. The cross-sectional area of the node 13 in the transverse plane has a centroid 21. The centroid 21 is defined such that any line intersecting it divides the cross-sectional area of the node 13 containing the centroid 21 into equal areas. It should be recognized that the centroid 21 can be defined for regular and irregular shapes.

As depicted in FIGS. 2A, 2B, and 2C, the spatular plate portions 15 are radially distributed about the nodes 13 such that there exists at least one line 23 through the centroid 21 and at least two spatular plate portions 15. In particular, FIG. 2A depicts two plate portions 15 radially distributed around the node 13 with line 23 through the centroid 21 and the two spatular plate portions 15. FIG. 2B depicts three spatular plate portions 15 radially distributed about the node 13, with line 23 through the centroid 21 and two of the three spatular plate portions 15. FIG. 2C depicts a group of spatular plate portions 15, which are formed as a single unitary structure, radially distributed about the node 13, with line 23 through the centroid 21 and two of the group of spatular plate portions 15. It should be recognized that the spatular plate portions 15 depicted in FIGS. 2A, 2B, and 2C need not have the same shapes or sizes to provide opposing peeling forces for at least two spatular plate portions 15.

To achieve enhanced adhesion, the spatular plate portion 15 should be a membrane, i.e., have negligible flexural rigidity. For the spatular plate portion to be considered a membrane, according to Szilard, R., *Theories and Applications of Plate Analysis*, New Jersey: John Wiley & Sons, pg. 5 (2004), which is incorporated hereby reference in its entirety for all purposes, the thickness should be at most one-fiftieth of the governing plate length, and so $t/l \leq 1/50$. In one preferred embodiment, the ratio of a maximum plate thickness to a maximum plate length is at most about 1/20. These structures, however, exhibit bond strength similar to that predicted by the Kendall peel model for membranes (Hansen, W. and Autumn, K. "Evidence for Self-cleaning in Gecko Setae," PNAS 102, pp. 385-389 (2005), which is incorporated by reference herein in its entirety for all purposes).

Thus, in one preferred embodiment, each spatular plate portion 15 has an appropriate ratio of a maximum plate thickness to a maximum plate length of at most about 1:20 to possess membrane-like properties predicted by linear elastic membrane theory. The maximum plate length is at least about 100 nanometers. When the spatular plate portion 15 is in contact with a contact surface, the spatular plate portion 15 adheres to the contact surface using intermolecular forces.

In determining the ratio of the maximum plate thickness to the maximum plate length of a spatular plate portion 15, the maximum plate thickness is the thickness of the thickest portion of the spatular plate portion 15. The maximum plate length is the maximum distance from a point on a boundary of the spatular plate portion 15 to a boundary of the node 13 measured on line 23 in a transverse plane containing both the node 13 and spatular plate portion 15. The transverse plane contains the greatest cross-sectional area of any transverse plane containing the node 13 and spatular plate portion 15. The cross-sectional area of the node 13 in the transverse plane has the centroid 21. The line 23 in the transverse plane is the longest line between two points on the boundaries of two spatular plate portion 15 that goes through the centroid 21.

FIGS. 3A, 3B, and 3C depict cross-sections of the supporting stalk 11, node 13, and spatular plate portion 15. As depicted in FIGS. 3A, 3B, and 3C, the maximum plate thickness, $t_{max}$, is the thickness of the thickest portion of the spatular plate portion 15. As also depicted in FIGS. 3A, 3B, and 3C, portions of the node 13 may be thicker than the thickest portion of the spatular plate portion 15.

The thickness of spatular plate portion 15 need not be uniform. For example, FIG. 3A depicts a spatular plate portion 15 with a thickness that gradually decreases. FIG. 3B depicts a spatular plate portion 15 with varying thicknesses. FIG. 3C depicts a spatular plate portion 15 with substantially uniform thicknesses.

As depicted in FIGS. 3D, 3E, and 3F, which correspond to FIGS. 3A, 3B, and 3C, respectively, in determining the ratio of the maximum plate thickness to the maximum plate length of a spatular plate portion 15, the maximum plate length is measured along the line 23 from a boundary of the spatular plate portion 15 to the centroid 21 of the node 13. The line 23 is in a transverse plane that contains the node 13 and spatular plate portion 15. The transverse plane contains the greatest cross-sectional area of any transverse plane containing the node 13 and spatular plate portion 15. The cross-sectional area of the node 13 in the transverse plane has the centroid 21. The line 23 along which the maximum plate length is measured is the longest line that connects two points on the boundaries of two spatular plate portions 15 through the centroid 21. The maximum plate length is the maximum distance from a point on a boundary of the spatular plate portion 15 to a boundary of the node 13 measured along the line 23.

FIGS. 3D, 3E, and 3F, depict top views of transverse planes of the nodes 13 and spatular plate portions 15. The maximum plate length, l, of a spatular plate portion 15 is measured on a line 23 in a transverse plane that connects two points on the boundaries of two spatular plate portions 15 through the centroid 21. FIGS. 3D, 3E, and 3F depict maximum plate length, l, of spatular plate portions 15. Note that FIGS. 3D, 3E, and 3F depict portions of the lines 23 along which the maximum plate length, l, is measured. In particular, the portions of the lines 23 running from the boundary of one spatular plate portion 15 to the centroid 21 are depicted. It should be recognized that the lines continue from the centroid 21 to the boundary of another spatular plate portion 15.

Figure 4A:
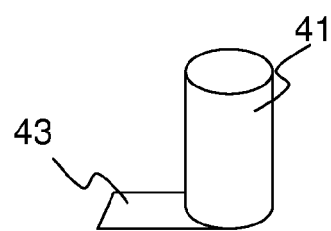
FIG. 4A illustrates an exemplary geometry of a spatular plate portion of a fabricated nano-structure.
Figure 4B:
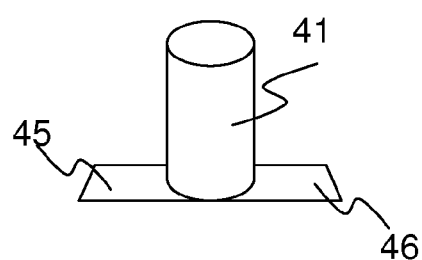
FIG. 4B illustrates another exemplary geometry of a spatular plate portion of a fabricated nano-structure.
Figure 4C:
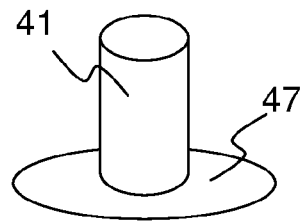
FIG. 4C illustrates another exemplary geometry of a spatular plate portion of a fabricated nano-structure.
Figure 4D:
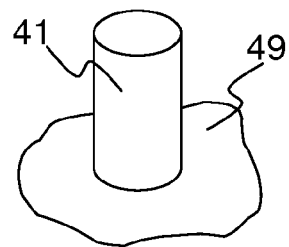
FIG. 4D illustrates another exemplary geometry of a spatular plate portion of a fabricated nano-structure.

FIGS. 4A, 4B, 4C, and 4D illustrate various exemplary embodiments of spatular plate portions having different geometries. In particular, FIG. 4A depicts a spatular plate portion 43 with a rectangular shape attached to supporting stalk 41. FIG. 4B depicts two spatular plate portions 45 and 46 with rectangular shapes attached to supporting stalk 41. FIG. 4C depicts spatular plate portions 47 formed as a single unitary structure with a circular shape attached to supporting stalk 41. FIG. 4D depicts spatular plate portions 49 formed as a single unitary structure with an irregular shape attached to supporting stalk 41. It should be recognized that the various shapes of the spatular plate portions depicted in FIGS. 4A, 4B, 4C, and 4D are intended to be exemplary and not exhaustive, and that the spatular plate portions can have any shape that allows peeling resistance in opposing directions.

The following description provides an analysis of adhesion when the supporting stalk 41 is pulled away from a contact surface to which the corresponding spatular plate portions are adhered. In particular, assume the supporting stalk 41 is pulled by a distance s in a direction normal to the contact surface to which the corresponding spatular plate portions are adhered. As shown below, potential energy, U, can be calculated by integrating the total force over a deformable surface area:

$$U = \int_\Omega \left\{ \frac{Et}{2(1-\eta^2)} \varepsilon^2 + \gamma_{\mathit{eff}} \right\} dA \tag{1}$$

In equation (1), U is the potential energy, E is the elastic modulus, η is Poisson's ratio, ε is the elastic strain, $\gamma_{\mathit{eff}}$ is the work of adhesion, t is the thickness of the plate, and Ω is the deformable area. Equation (1) implies that for a prescribed s, the surface Ω is restricted to a one-parameter family Ω(v). Therefore, the potential reduces to the form U=U(s, v), where v is the length of delamination. According to the Kendall peel model, ∂U/∂v=0 at equilibrium (see K. Kendall. "The adhesion and surface energy of elastic solids," Journal of Physics D 4, pp. 1186-1195 (1971), which is incorporated herein in its entirety for all purposes). Thus, let U*(s)={U:∂U/∂v=0; s} represent the energy at equilibrium for a prescribed s. The bond strength, which is defined as the resistance of the membrane to delamination, then may be expressed as P=dU*/ds.

Figure 5A:
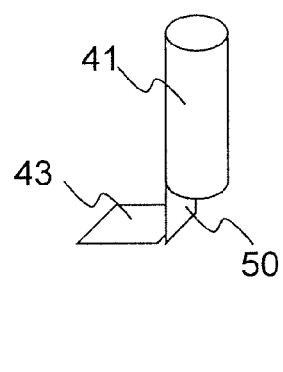
FIG. 5A illustrates an exemplary geometry of a delaminated spatular plate portion of the fabricated nano-structure depicted in FIG. 4A.
Figure 5B:
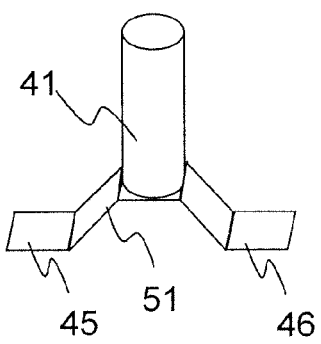
FIG. 5B illustrates an exemplary geometry of a delaminated spatular plate portion of the fabricated nano-structure depicted in FIG. 4B.
Figure 5C:
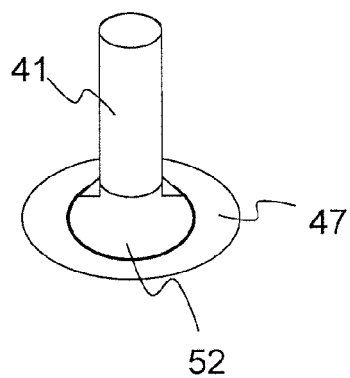
FIG. 5C illustrates an exemplary geometry of a delaminated spatular plate portion of the fabricated nano-structure depicted in FIG. 4C.

FIGS. 5A, 5B, and 5C depict the respective configurations as shown in FIGS. 4A, 4B, and 4C with shaded areas representing the delaminated portions 50, 51, and 52 of the spatular plate portions 43, 45, and 47, respectively, after being pulled off from the contact surface. The delaminated portions 50, 51, and 52 are used in the calculation of relative bond strength from potential energy. For the exemplary embodiment depicted in FIG. 5A with spatular plate portions 43 having rectangular shapes, the elastic strain ε can be characterized as follows:

$$\varepsilon = \frac{1}{2}\left(\frac{s}{v}\right)^2. \tag{2}$$

s is the prescribed pulled off amount and v is the delamination length at equilibrium Substituting the elastic strain of equation (2) into (1) and solving ∂U/∂v=0 for v yields the delamination length at equilibrium for a prescribed s. Next, substituting this value of v into U(s,v) gives U*(s). As shown above P=dU*/ds. Therefore, bond strength, $P_b$, for the configurations shown in FIGS. 4A and 5A, is:

$$P_b = \frac{dU^*}{ds} = 4w\left[\frac{2\gamma_{\mathit{eff}}^3 Et}{27(1-\eta^2)}\right]^{\frac{1}{4}}. \tag{3}$$

For the exemplary embodiment depicted in FIG. 5B with spatular plate portions 45 having a single unitary structure with a circular shape, the elastic strain ε can be characterized as follows:

$$\varepsilon = \varepsilon(s) = \frac{s^2}{2v(s+R)} \frac{1}{\ln(1+v/R)}. \tag{4}$$

v is the delamination length, s is the distance of the surface element from the stalk axis, and R is the radius.

Substituting the elastic strain of equation (4) into (1) and solving ∂U/∂v=0 for v yields the delamination length at equilibrium for a prescribed s. Next, substituting this value of v into U(s, v) gives U*(s). Therefore, bond strength, $P_c$, for the configurations shown in FIGS. 4B and 5B, is:

$$P_c = \frac{dU^*}{ds} \approx 2\pi w\left[\frac{2\gamma_{\mathit{eff}}^3 Et}{27(1-\eta^2)}\right]^{\frac{1}{4}}. \tag{5}$$

From the bond strengths predicted in equations (3) and (5), it can be seen that the more symmetrical spatular plate portion geometries will have greater bond strength. For example, with reference to the calculated bond strengths (nN) in the table depicted in FIG. 6, the relative bond strengths of the exemplary embodiments shown in FIGS. 4A and 4B are shown. In particular, different widths of spatular plate portions are provided in the first column. The calculated bond strengths (nN) for the different widths of spatular plate portions without opposing plate portions are provided in the second column. The calculated bond strengths (nN) for the different widths of spatular plate portions with opposing plate portions that are rectangular in shape are provided in the third column. The calculated bond strengths (nN) for the different widths of spatular plate portions with opposing plate portions that are circular in shape are provided in the fourth column.

Some adhesion strength of the embodiments of the spatular plate portions formed as a circular unitary structure (shown in FIGS. 4B and 5B) can be attributed in part to suction since the delamination area is sealed from air. However, as will be shown below, suction force is not a significant contribution to the overall adhesion strength.

In particular, suction force is bounded by the theoretical limit:

$$P_s = \pi (l/2)^2 p_{air}, \tag{6}$$

where l is the spatular width and $p_{air}$ is the pressure of air, 101.3 kPa. For example, if the assumed diameter of the cylindrical support fiber is 0.2 microns, the thickness of the spatular plate portion, t, is 10 nm, the elastic modulus, E, is 8 GPa, and the effective work of adhesion, $\gamma_{\mathit{eff}}$, is 30 mJ/m².

The calculated bond strengths (nN) for the different widths of spatular plate portions assuming suction as the only mechanism of adhesion are provided in the fifth column. The adhesion force due to suction is less than 10% of the peel analysis bond strength. Thus, suction is not a considerable force in the overall bond strength.

One obstacle to intimate contact between two opposing bodies is surface roughness. In gecko adhesive, this obstacle is overcome by having spatular plate portions that are sufficiently thin that they exhibit membrane-like behavior. The effect of surface roughness on reducing the real area of contact decreases with plate thickness. Hence, for a spatular plate portion, contact area increases with decreasing thickness.

Figure 7:
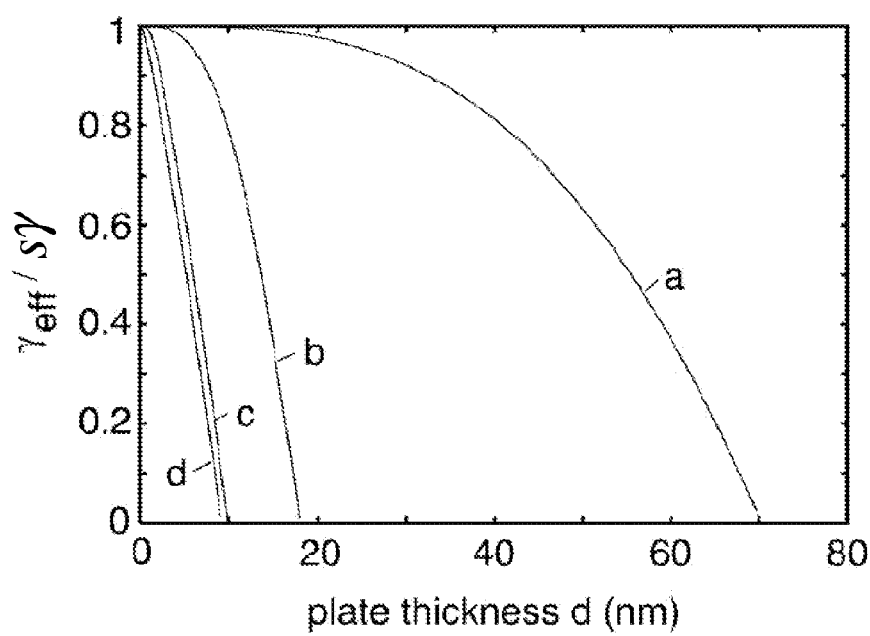
FIG. 7 is a graph illustrating the ratio of effective work of adhesion to work of adhesion for ideally smooth surfaces.

The graph in FIG. 7 illustrates the ratio of the effective work of adhesion to work of adhesion for ideally smooth surfaces ($\gamma_{eff}/\gamma$) versus plate thickness in nanometers, t, on 0.3 micron sandpaper (Persson B, et al. "The effect of surface roughness on the adhesion of elastic plates with application to biological systems," Journal of Chemical Physics 119, pp. 11437-11444 (2003), which is incorporated herein in its entirety for all purposes). This ratio provides a direct relationship to the bond strength.

For example, if $\gamma_{eff}/\gamma$ is 1, then the adhesion strength is equal to the ideal adhesion strength to a smooth surface, which would be the highest bond strength possible. The elastic modulus E is assumed to be $(4\times10^{10}\text{ m}^{-1})(1-\eta^2)\gamma$, where $\eta\sim0.3$ is Poisson's ratio.

Each plot shown in FIG. 7 represents various intermolecular cut-off distances, defined as the smallest distance allowed between the nuclei of surface atoms on the contacting substrates. Ion-ion repulsion force prevents distances below the intermolecular cut-off distance. The plots are shown for distances: (a) $6.3\times10^{-7}$ m, (b) $6.3\times10^{-8}$ m, (c) $6.3\times10^{-9}$ m, and (d) $6.3\times10^{-10}$ m. A qualitative reading of the graph in FIG. 7 indicates that thinner plates provide stronger adhesion to the substrate.

FIG. 7 represents the relationship of effective work of adhesion on one value of surface roughness for an example. Other roughness values will change the curves of the plots shown in FIG. 7. A thinner plate is the ideal geometry of a synthetic spatula for strong adhesion. In general, for a spatular plate portion to behave like a membrane, it should be thin, which in a preferred embodiment is a thickness less than or equal to about 5% of the plate length. With reference to FIG. 6, considering a spatular plate portion of length $\geq 0.2$ microns, the plate thickness is preferably about 10 nm.

Figure 8:
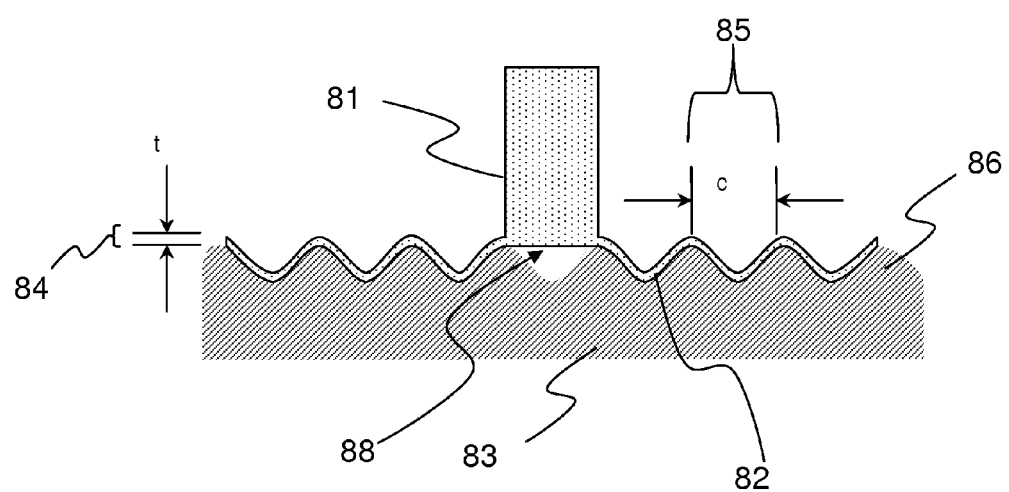
FIG. 8 illustrates a side view of a fabricating nano-structure contacting a surface with a surface roughness.

FIG. 8 depicts a supporting stalk 81 with spatular plate portions 82 radially distributed around node 88 adhering to a contact surface 83. To achieve enhanced adhesion, the plate thickness 84 is preferably less than about 5% of the spacing 85 between surface asperities 86, which makes up the surface roughness of the contact surface 83. Surface asperities 86 is typically spaced greater than about 0.2 microns apart, and should not be a dominant factor in determining plate thickness.

Although certain exemplary embodiments have been described above, those skilled in the art will readily appreciate that many modifications are possible in the exemplary embodiments without materially departing from the novel teachings and advantages of this invention. For example, aspects of embodiments disclosed above can be combined in other combinations to form additional embodiments. Accordingly, all such modifications are inended to be included within the scope of this invention.

We claim:

1. A fabricated nano-fiber structure, comprising:
   a substrate;
   a supporting stalk having a first end and a second end, wherein the second end is opposite the first end, wherein the first end is connected to the substrate, and wherein the supporting stalk has a diameter of about 50 nanometers to about 2 microns;
   a node that is disposed at the second end of the supporting stalk; and
   at least two spatular plate portions connected to the node, wherein the at least two spatular plate portions have planar geometries,
   wherein the at least two spatular plate portions are radially distributed about the node,
   wherein each of the at least two spatular plate portions has a ratio of a maximum plate thickness to a maximum plate length of at most 1:20, wherein the maximum plate length is along a line from a boundary of the spatular plate portion to the centroid of the node, and wherein the maximum plate length is at least about 100 nanometers, and
   wherein the at least two spatular plate portions are adapted to adhere to a contact surface using intermolecular forces when the spatular plate portions are in contact with the contact surface.

2. The fabricated nano-fiber structure of claim 1, for each of the at least two spatular plate portions:
   the maximum plate thickness is the thickness of the thickest portion of the spatular plate portion, and
   the maximum plate length is the maximum distance from a point on the boundary of the spatular plate portion to a boundary of the node on the line in a transverse plane that contains the node and spatular plate portion,
   wherein the transverse plane contains the greatest cross-sectional area of any transverse plane containing the node and the spatular plate portion,
   wherein the cross-sectional area of the node in the transverse plane includes the centroid of the node, and
   wherein the line is the longest line that connects a first point and a second point through the centroid,
      wherein the first point is a point on the boundary of the spatula plate portion, and
      wherein the second point is a point on the boundary of another spatula plate portion of the at least two spatular plate portions.

3. The fabricated nano-fiber structure of claim 1, wherein the maximum plate thickness of each of the at least two spatular plate portions is about 50-100 nanometers.

4. The fabricated nano-fiber structure of claim 1, wherein the maximum plate thickness of each of the at least two spatular plate portions is about 5-50 nanometers.

5. The fabricated nano-fiber structure of claim 1, wherein the at least two spatular plate portions have rectangular shapes.

6. The fabricated nano-fiber structure of claim 1, wherein the at least two spatular plate portions have circular shapes.

7. The fabricated nano-fiber structure of claim 1, wherein the at least two spatular plate portions are symmetrical with respect to the supporting stalk.

8. The fabricated nano-fiber structure of claim 1, wherein the maximum spatular plate length is about 100-500 nanometers.

9. The fabricated nano-fiber structure of claim 1, wherein the contact surface can have spacing between surface asperities of at most 20 times the maximum plate thickness.

10. The fabricated nano-fiber structure of claim 1, wherein the spatular plate portions are portions of a unitary structure.

11. The fabricated nano-fiber structure of claim 10, wherein the unitary structure has a circular shape.

12. The fabricated nano-fiber structure of claim 10, wherein the unitary structure has an irregular shape.

13. A method of forming a fabricated nano-fiber structure, comprising:
   obtaining a substrate;
   forming a supporting stalk on the substrate, wherein the supporting stalk has a first end and a second end, wherein the second end is opposite the first end, and wherein the first end is connected to the substrate, and wherein the supporting stalk has a diameter of about 50 nanometers to about 2 microns;

forming a node disposed at the second end of the supporting stalk; and forming at least two spatular plate portions connected to the node, wherein the at least two spatular plate portions have planar geometries, wherein the at least two spatular plate portions are radially distributed about the node, and wherein each of the at least two spatular plate portions has a ratio of a maximum plate thickness to a maximum plate length of at most about 1:20, wherein the maximum plate length is along a line from a boundary of the spatular plate portion to the centroid of the node, and wherein the maximum plate length is at least 100 nanometers.

14. The method of claim 13, wherein for each of the at least two spatular plate portions:

the maximum plate thickness is the thickness of the thickest portion of the spatular plate portion, and the maximum plate length is the maximum distance from a point on the boundary of the spatular plate portion to a boundary of the node on the line in a transverse plane that contains the node and spatular plate portion, wherein the transverse plane contains the greatest cross-sectional area of any transverse plane containing the node and the spatular plate portion, wherein the cross-sectional area of the node in the transverse plane includes the centroid of the node, and wherein the line is the longest line that connects a first point and a second point through the centroid, wherein the first point is a point on the boundary of the spatula plate portion, and wherein the second point is a point on the boundary of another spatula plate portion of the at least two spatular plate portions.

15. A method of permanently adhering a fabricated nanofiber structure to a contact surface, comprising:

obtaining a substrate having:

a supporting stalk having a first end and a second end, wherein the second end is opposite the first end, wherein the first end is connected to the substrate, and wherein the supporting stalk has a diameter of about 50 nanometers to about 2 microns;

a node that is disposed at the second end of the supporting stalk; and at least two spatular plate portions connected to the node, wherein the at least two spatular plate portions have planar geometries, wherein the at least two spatular plate portions are radially distributed about the node, and wherein each of the at least two spatular plate portions has a ratio of a maximum plate thickness to a maximum plate length of at most 1:20, wherein the maximum plate length is along a line from a boundary of the spatular plate portion to the centroid of the node, and wherein the maximum plate length is at least about 100 nanometers; and positioning the substrate with the spatular plate portions facing the contact surface to adhere the spatular plate portions to the contact surface using intermolecular forces.

16. The method of claim 15, for each of the at least two spatular plate portions:

the maximum plate thickness is the thickness of the thickest portion of the spatular plate portion, and the maximum plate length is the maximum distance from a point on the boundary of the spatular plate portion to a boundary of the node on the line in a transverse plane that contains the node and spatular plate portion, wherein the transverse plane contains the greatest cross-sectional area of any transverse plane containing the node and the spatular plate portion, wherein the cross-sectional area of the node in the transverse plane includes the centroid of the node, and wherein the line is the longest line that connects a first point and a second point through the centroid, wherein the first point is a point on the boundary of the spatula plate portion, and wherein the second point is a point on the boundary of another spatula plate portion of the at least two spatula plate portions.

* * * * *

UNITED STATES PATENT AND TRADEMARK OFFICE
CERTIFICATE OF CORRECTION

| | |
|---|---|
| PATENT NO. | : 8,309,201 B2 |
| APPLICATION NO. | : 11/843619 |
| DATED | : November 13, 2012 |
| INVENTOR(S) | : Carmel Majidi et al. |

It is certified that error appears in the above-identified patent and that said Letters Patent is hereby corrected as shown below:

Column 1, line 7, after the heading CROSS REFERENCE TO RELATED APPLICATION the following new heading should be added and the below paragraph inserted:

--STATEMENT REGARDING FEDERALLY SPONSORED RESEARCH OR DEVELOPMENT
This invention was made with Government support under EEC-0304730 awarded by the National Science Foundation. The Government has certain rights in the invention.--

Signed and Sealed this
Twelfth Day of March, 2013

Teresa Stanek Rea
*Acting Director of the United States Patent and Trademark Office*